(12) United States Patent
Pan

(10) Patent No.: US 8,265,262 B2
(45) Date of Patent: Sep. 11, 2012

(54) METHOD AND APPARATUS FOR OPTIMIZING LAYERED SERVICE ROUTING OF A CALL CENTER

(75) Inventor: Jian Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 622 days.

(21) Appl. No.: 12/496,076

(22) Filed: Jul. 1, 2009

(65) Prior Publication Data

US 2009/0296919 A1     Dec. 3, 2009

Related U.S. Application Data

(63) Continuation of application No. PCT/CN2008/071972, filed on Aug. 13, 2008.

(30) Foreign Application Priority Data

Jan. 30, 2008    (CN) .......................... 2008 1 0000295

(51) Int. Cl.
     *H04M 3/00*          (2006.01)
(52) U.S. Cl. .............................. 379/266.01; 379/266.03
(58) Field of Classification Search ............. 379/266.01, 379/266.03
See application file for complete search history.

(56) References Cited

U.S. PATENT DOCUMENTS

| | | |
|---|---|---|
| 7,233,980 B1 | 6/2007 | Holden et al. |
| 2001/0000458 A1 | 4/2001 | Shtivelman et al. |
| 2003/0200333 A1 | 10/2003 | Espieu et al. |

FOREIGN PATENT DOCUMENTS

| | | |
|---|---|---|
| CN | 1205146 A | 1/1999 |
| CN | 1293798 A | 5/2001 |
| CN | 1499847 A | 5/2004 |
| CN | 1741627 A | 3/2006 |
| CN | 101232539 | 7/2008 |
| JP | 2006-345125 A | 12/2006 |
| WO | WO 2005/041551 A1 | 5/2005 |

OTHER PUBLICATIONS

First Chinese Office Action mailed Nov. 27, 2009, issued in related Chinese Application No. 2008100002957, Huawei Technologies Co., Ltd., 11 pages.
Written Opinion of the International Searching Authority (English Translation), mailed Oct. 23, 2008, for International Application No. PCT/CN2008/071972, Huawei Technologies Co., Ltd., 4 pages.
Zhong L, et al., "A Routing Algorithm Based on Priority for Communication Network," Fire Control & Command Control, vol. 25, No. 1, Mar. 2000, 6 pages.

(Continued)

*Primary Examiner* — Rasha Al Aubaidi
(74) *Attorney, Agent, or Firm* — Finnegan, Henderson, Farabow, Garrett & Dunner LLP

(57) ABSTRACT

A method and apparatus for optimizing layered service routing of a call center is provided. The method includes setting a level parameter threshold for each level group in a call queue, determining a compared call from the tail of the call queue when a new call arrives; inserting the new call after the compared call if a current level parameter of the compared call is larger than or equal to a level parameter threshold of a level group where the compared call belongs when the level of the new call is higher than the level of the compared call, and routing calls from the head of the call queue.

3 Claims, 6 Drawing Sheets

OTHER PUBLICATIONS

European Patent Office Communication relating to the extended European search report, pursuant to 62 EPC, the supplementary European search report (Art. 153(7) EPC) and the European search opinion; issued in related Application No. 08783965.0-2414; dated (mailed) Jun. 11, 2012; Huawei Tech Co., Ltd. (6 pgs.).

| Call queue | Level group 1 | Level group 2 | Level group 3 |
|---|---|---|---|
| Expected put-through rate | 90% | 80% | 70% |
| Minimum put-through rate | 80% | 70% | 60% |

Basic components | Extended components

METHOD AND APPARATUS FOR OPTIMIZING LAYERED SERVICE ROUTING OF A CALL CENTER

CROSS-REFERENCE TO RELATED APPLICATION

This application is a continuation of International Application No. PCT/CN2008/071972, filed on Aug. 13, 2008, titled "Method and Apparatus for Optimizing Layered Service Routing of a Call Center", which claims the priority of CN application No. 200810000295.7, filed on Jan. 30, 2008, titled "Method and Apparatus for Optimizing Layered Service Routing of a Call Center", the entire contents of these applications are hereby incorporated by reference in their entirety.

TECHNICAL FIELD

The present disclosure relates to communication technologies, and in particular, to a method and apparatus for optimizing layered service routing of a call center.

BACKGROUND

A call center is a complete integrated information service system that is operated by a company according to Computer Telephony Integration (CTI), a communication network, and a computer network. Common call center numbers include 10086, 114 and 95555. Generally, a call center provides layered services on the basis of service levels. Layered services are differentiated services that are provided for customer groups at different levels. By means of layered services, the call center supports customer group so as to provide green service paths for VIP customers and business customers.

The key technique for implementing layered services is to group customers, and specifically, to group existing customers to various types of customer groups according to their consumption capability and lifetime value. Different customer groups correspond to different levels. Each type of customer group is further divided into different level groups. In practice, a customer is placed in a call queue corresponding to the customer group it belongs to. Take the call queues of the China Mobile operator for example. The call queues include VIP queue, GoTone queue, M-Zone queue and other queues, as shown in FIG. 1, where the level descends in order of VIP queue, GoTone queue, M-Zone queue and other queues. Each call queue is further divided into different level groups. For example, the VIP queue is divided into a diamond level group, a gold level group, a silver level group and a common level group.

The throughput rate of a call queue means the throughput within n seconds of waiting, where different customer groups correspond to different n values. After the expected throughput rate and the minimum throughput rate are set for each call queue, the call center calculates the real-time throughput rate of the call queues on a timed basis so as to determine the priority of call routing according to a set policy in real time. Specifically, the system determines whether the throughput rate of the call queue of the highest priority meets the requirement. If the requirement is not met while a customer is waiting in the call queue, the system first routes the call of the customer waiting in the queue. If the throughput rate of the call queue of the highest priority meets the requirement, the system determines whether the throughput rate of the call queue of the second highest priority meets the requirement and so on. In FIG. 1, if the throughput rate of the VIP queue does not meet the requirement, the call center serves customers in the VIP queue first and continues to route customers in the next level call queue when the throughput rate of the VIP queue meets the requirement.

This customer group based layered service solution guarantees that a higher level customer group is served prior to a lower level customer group. However, because the call center always chooses customers from the head of a queue, it is possible that a low level customer in one call queue should fail to be served all the time in a specific customer group. For example, in FIG. 1, when the call center chooses customers in the VIP queue, diamond level customers that are lined at the head of the queue are chosen in precedence. When a new VIP customer joins, the newcomer is inserted into the queue according to its level. For example, when a gold level VIP customer comes, the gold level VIP customer is inserted into the gold level position in the queue. The system chooses the gold level, silver level and common level customers in turn after all diamond level customers are served. If there are diamond or gold VIP customers all the time, calls of silver and common customers will not be routed despite their long-time waiting.

In view of this, to ensure the throughput rate of low level customers in a call queue, an easy solution is to set a queue for each level group and adopt layered services for the queues so as to balance the throughput rates of the queues. As shown in FIG. 2, this solution needs to configure and maintain 14 queues. With this solution, it is necessary to set a queue for each level group. As a result, too many queues have to be configured and it is more complex to monitor the state of each queue. Hence, the solution is hard to implement in practice.

BRIEF SUMMARY

Embodiments disclosed herein may provide a method and apparatus for optimizing layered service routing of a call center and may resolve the issue of low throughput rates for low level customers in a call queue in the conventional art.

Consistent with the disclosed embodiments, there is provided a method for optimizing layered service routing of a call center including setting a level parameter threshold for each level group in a call queue, determining a compared call from the tail of the call queue when a new call arrives, inserting the new call after the compared call if a current level parameter of the compared call is larger than or equal to a level parameter threshold of a level group where the compared call belongs when the level of the new call is higher than the level of the compared call, and routing calls from the head of the call queue.

Alternatively, another method for optimizing layered service routing of a call center is also provided. This method includes setting a level parameter threshold for each level group in a call queue, obtaining a current level parameter of each level group, comparing the current level parameter of each level group with a respective level parameter threshold of the level group and determined a level group of a highest priority according to a comparison result, and routing calls in the level group of the highest priority after finishing the comparison.

Consistent with some embodiments, the methods for optimizing layered service routing of a call center may include at least a step of setting a level parameter threshold for each level group in a call queue.

An apparatus for optimizing layered service routing of a call center is also provided. The apparatus may include a threshold storing unit, adapted to store a level parameter threshold of each level group in a call queue; an obtaining unit, adapted to obtain a current level parameter of each call, a deciding unit, adapted to determine a compared call for level comparison with a new call from the tail of the call queue, a queue controlling unit, adapted to judge whether a current level parameter of the compared call is larger than or equal to a level parameter threshold of a level group where the compared call belongs when the level of the new call is higher than the level of the compared call and if so, insert the new call after the compared call; and a routing unit, adapted to route calls at the head of the call queue.

Alternatively, another apparatus for optimizing layered service routing of a call center is adapted to determine a level group of a highest priority in a call queue is also provided. This apparatus may include a threshold storing unit, adapted to store a level parameter threshold of each level group in a call queue, an obtaining unit, adapted to obtain a current level parameter of each level group, a comparing unit, adapted to compare the current level parameter of each level group with a respective level parameter threshold and determine a level group of a highest priority according to a comparison result, and a routing unit, adapted to route calls in the level group of the highest priority.

According to some embodiments, the apparatuses for optimizing layered service routing of a call center may include at least a threshold storing unit.

It is to be understood that both the foregoing general description and the following detailed description are exemplary and explanatory only and are not restrictive of the embodiments disclosed herein.

The accompanying drawings, which are incorporated in and constitute a part of this specification, illustrate some embodiments and together with the description, serve to explain the principles of the embodiments disclosed herein.

DETAILED DESCRIPTION OF THE DISCLOSED EMBODIMENTS

Reference will now be made in detail to embodiments disclosed in the accompanying drawings. Wherever possible, the same reference numbers will be used throughout the drawings to refer to the same or like parts.

In some embodiments, the queue time of calls in a call queue is monitored to determine the position of a newcomer in the queue so as to guarantee the throughput rate of low level customers.

The method according to this embodiment may include the following steps:

1. Set a level parameter threshold for each level group in a call queue.
2. Determine a compared call from the tail of the call queue when a new call arrives.
3. When the level of the compared call is higher than the level of the new call, if the current level parameter of the compared call is larger than or equal to the level parameter threshold of the call, the new call is placed after the compared call.
4. Route calls from the head of the call queue.

The current level parameter refers to cumulative queue time and the level parameter threshold refers to queue tolerance duration. A specific example is given below and not intended to limit the form of the level parameter.

Figure 3:
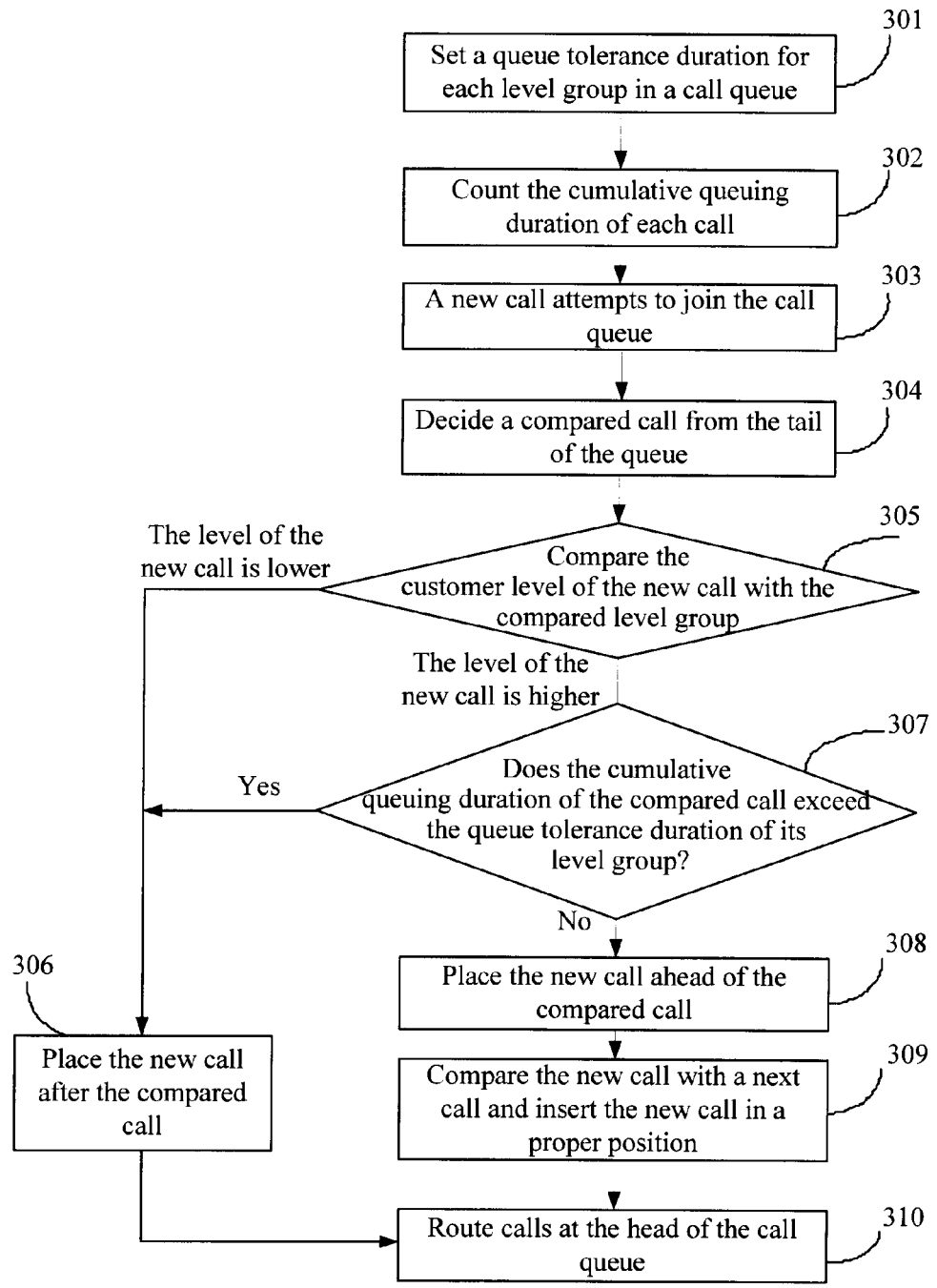
FIG. 3 is a procedure of a method for optimizing layered service routing of a call center according to some embodiments.

FIG. 3 is a procedure of a method for optimizing layered service routing of a call center according to some embodiments. As shown in FIG. 3, the method for optimizing layered service routing of a call may include the following steps:

Step 301: Set a queue tolerance duration for each level group in a call queue.

Figures 1, 2:
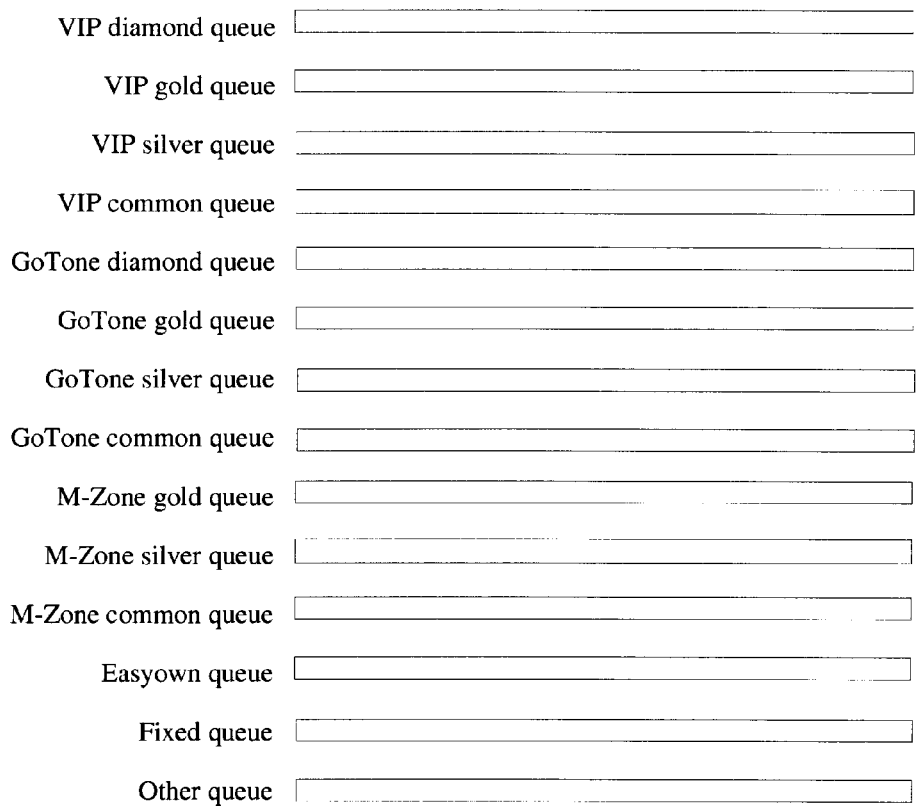
FIG. 1 is a schematic drawing showing layers of a conventional call queue.
FIG. 2 is a schematic drawing of setting queues for level groups according to the related art.

Generally, a shorter queue tolerance duration is set for a higher level so as to guarantee that calls of higher level customers are routed in precedence. In FIG. 1, for example, the queue tolerance duration ascends in order of diamond, gold, silver and common level groups.

In addition, to control the queue duration of each call more accurately, a queue tolerance duration may be set for each call, but the configuration efforts are huge. Setting a queue tolerance duration for a level group means all calls in the level group have the same queue tolerance duration.

Step 302: Count the cumulative queue time of each call.
Step 303: A new call attempts to join the call queue.
Step 304: Determine a compared call from the tail of the queue.
Step 305: Compare the customer level of the new call with the compared level group and if the level of the new call is lower than the compared level group, go on with step 306, or else with step 307.
Step 306: Place the new call after the compared call.
Step 307: If the level of the new call is higher than the level of the compared call, determine whether the cumulative queue time of the compared call is longer than or equal to the queue tolerance duration of the level group of the compared call; if the cumulative queue time of the compared call is longer than or equal to the queue tolerance duration of the level group, execute step 306, if the cumulative queue time of the compared call is shorter than the queue tolerance duration of the level group, go on with step 308.
Step 308: Place the new call ahead of the compared call.
Step 309: Compare the new call with a next call until a proper position is found and insert the new call in the proper position.

The proper position is the position obtained in step 306, or the queue head if the new call has the highest priority.

Step 310: Choose calls from the queue head for call routing. This means routing calls at the head of the call queue.

Figure 4:
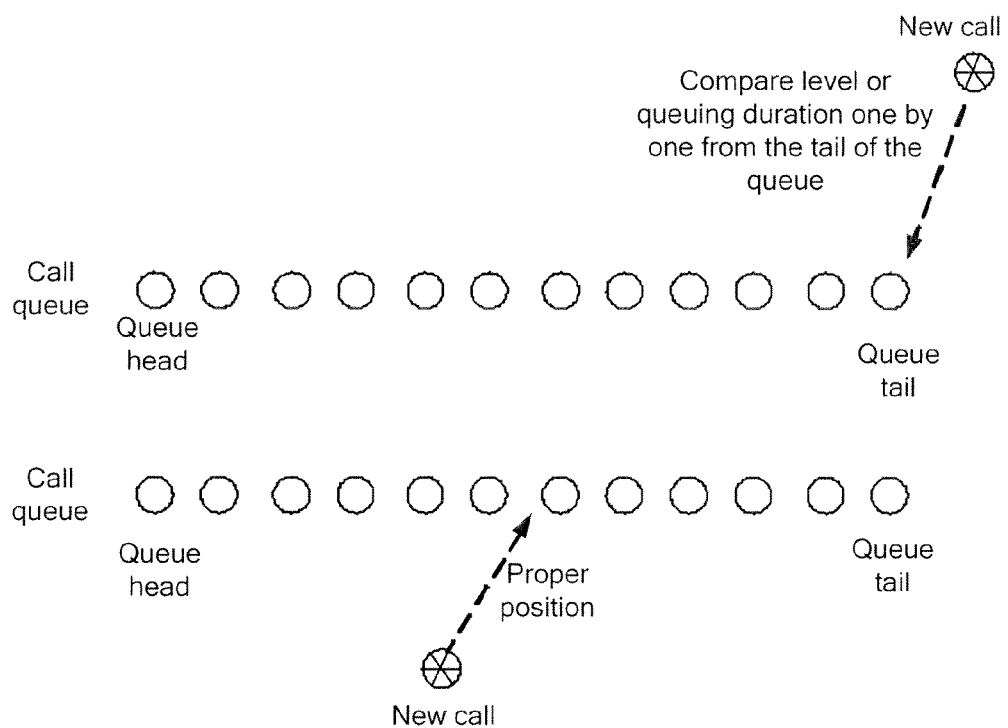
FIG. 4 shows a result of the method according to the embodiment shown in FIG. 3.

FIG. 4 shows a result of the method according to the embodiment shown in FIG. 3. As shown in FIG. 4, when the method according to the foregoing embodiment is adopted, the queue position of a new call is changed while routing still starts from the queue head.

According to some embodiments, it may only be necessary to count the cumulative queue time of calls and make comparisons to insert a new call into a proper queue position. This will not increase the implementation difficulty and load of the call center. With the foregoing easy comparisons, low level customers will also get efficient services.

A specific example is given below to illustrate the solution.

Suppose one call queue includes four calls, for example. call 1, call 2, call 3 and call 4, which belong to level groups A, B, C, and D respectively. Suppose the level of the four level groups descends in order; that is, the level of level group A where call 1 belongs is higher than the level of level group B where call 2 belongs, and so on. The preset queue tolerance duration and current cumulative queuing durations of the four calls are illustrated in Table 1.

TABLE 1

|  | Call 1 | Call 2 | Call 3 | Call 4 |
|---|---|---|---|---|
| Preset queue tolerance duration | 10 | 20 | 30 | 40 |
| Current cumulative queuing duration | 5 | 18 | 35 | 30 |

In the table, the current cumulative queuing duration of call 3 is 35 time units, already exceeding the respective queue tolerance which is 30 time units.

Suppose a new call X attempts to access. The call X belongs to level group B. If the technical solution in the related art is adopted, call X is inserted before call 3 because the level of level group C where call 3 belongs is lower than the level of level group B. If the technical solution provided by the foregoing embodiment is adopted, however, because the cumulative queuing duration of call 3 already exceeds its queue tolerance duration, to ensure that the long waiting call can be routed, the new call X is inserted after call 3.

According to some embodiments, the throughput rate is monitored to determine a call to route so as to guarantee the throughput rate of low level customers. A method for monitoring the throughput rate to determine a call route may include the following steps:

1. Set a level parameter threshold for each level group in a call queue.

2. Obtain the current level parameter of each level group.

3. Compare the current level parameter of each level group with the respective level parameter threshold and determine a level group of the highest priority according to the comparison result.

4. Route calls in the level group of the highest priority.

The current level parameter may be the current throughput rate and the level parameter threshold may be the minimum throughput rate. A specific example is given below and not intended to limit the form of the level parameter.

Figure 5:
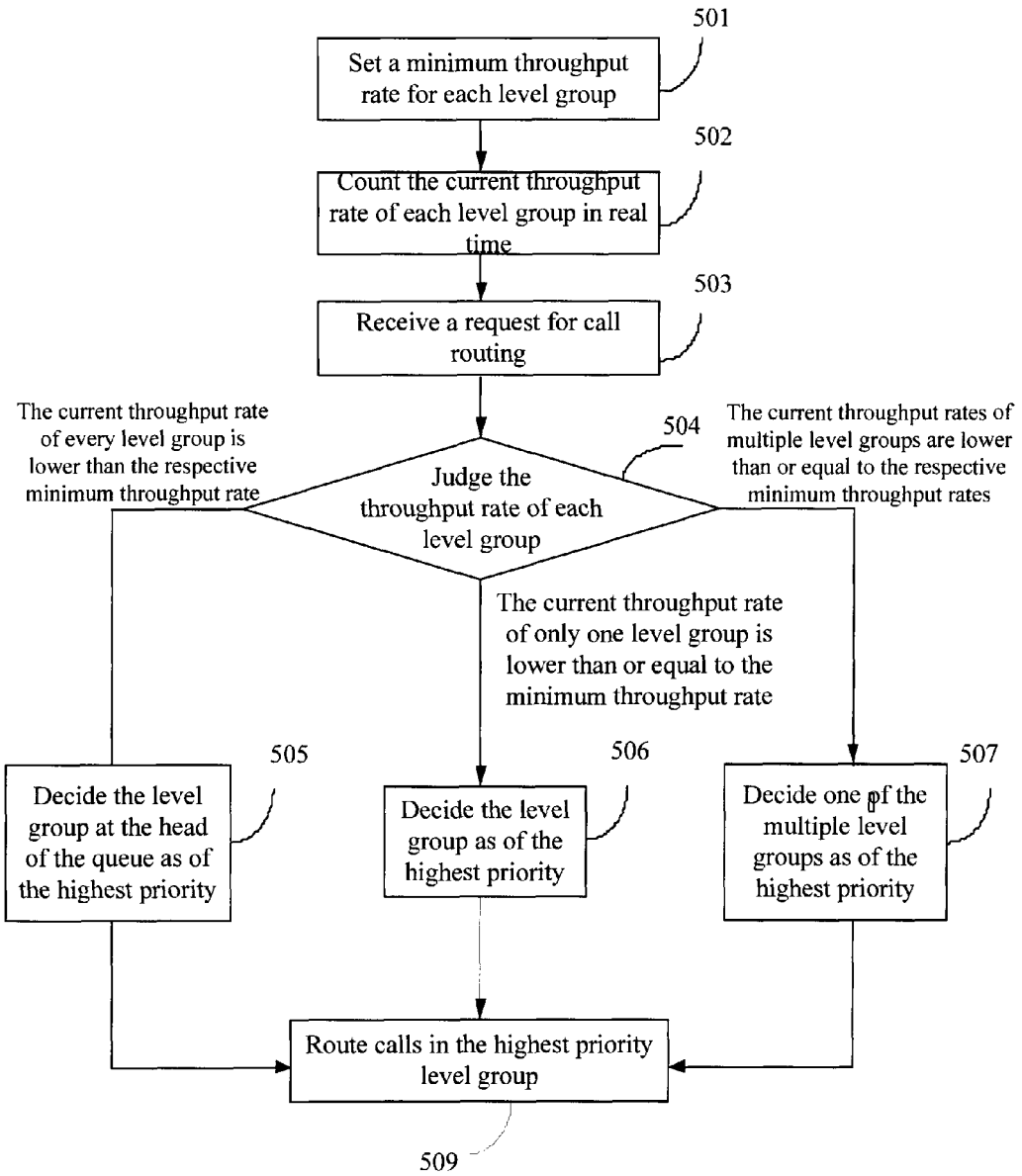
FIG. 5 is a procedure of another method for optimizing layered service routing of a call center according to some embodiments.

FIG. 5 is a procedure of another method for optimizing layered service routing of a call center according to some embodiments. As shown in FIG. 5, the method includes the following steps:

Step 501: Set a minimum throughput rate for each level group in a call queue.

Generally, a higher minimum throughput rate is set for a higher level so as to guarantee that calls of higher level customers are routed in precedence. In FIG. 1, for example, the minimum throughput rate descends in order of diamond, gold, silver and common levels.

Step 502: Count the current throughput rate of each level group in real time.

Step 503: There is a request for call routing, which means an agent needs to choose a call to serve.

Step 504: Determine whether the current throughput rate of each level group is lower than or equal to the respective preset minimum throughput rate.

Step 505: Determine the level group at the queue head as the level group of the highest priority if the current throughput rate of every level group is lower than or equal to the respective minimum throughput rate.

Step 506: If the current throughput rate of only one level group is not lower than or equal to (i.e. is higher than) its minimum throughput rate, determine this level group as the level group of the highest priority.

Step 507: If the current throughput rates of multiple level groups are not lower than or equal to (i.e. are higher than) their minimum throughput rates, determine one of these level groups as the level group of the highest priority according to a routing algorithm.

Step 508: Route calls in the level group of the highest priority.

Figures 6, 7:
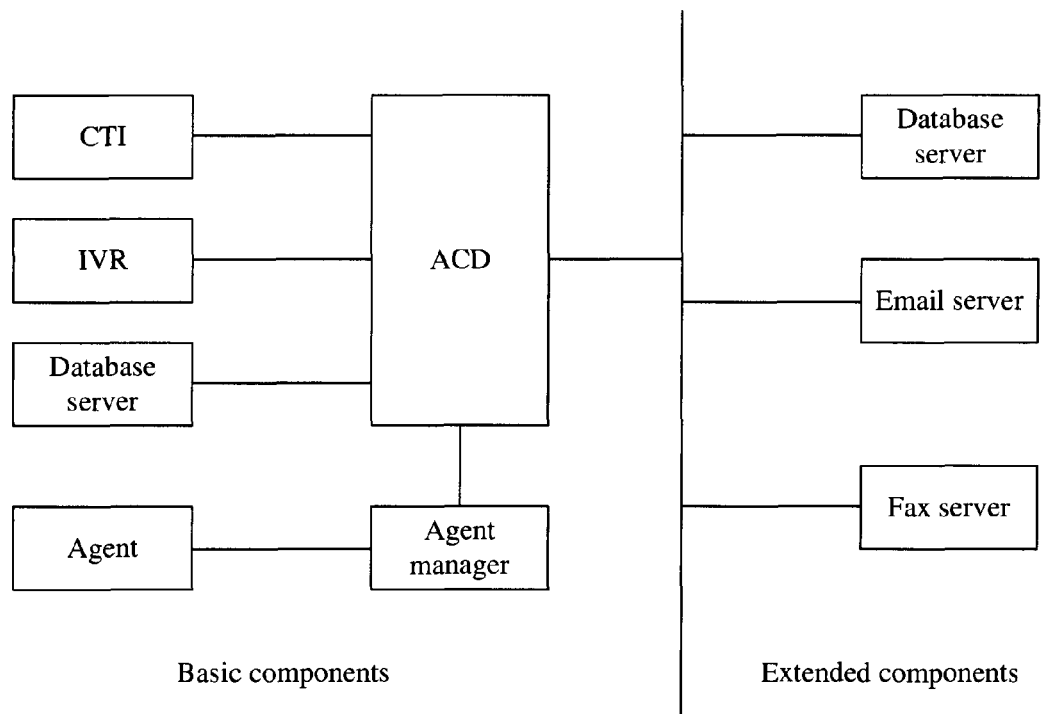
FIG. 6 is a specific example of the method shown in FIG. 5.
FIG. 7 is a schematic drawing showing a structure of a call center according to some embodiments.

FIG. 6 is an example of the method shown in FIG. 5. In FIG. 6, a minimum throughput rate is set for each level group in the call queue. For example, the minimum throughput rate of level group 1 is set to 80%; the minimum throughput rate of level group 2 is 70%; that of level group 3 60%. If the current throughput rate of only one level group (for example level group 1, 2 or 3) is lower than its minimum throughput rate, the level group is selected as a group of the highest priority. If the current throughput rates of two or three are lower than respective minimum values, a level group of the highest priority is determined according to a routing algorithm.

Any of conventional routing algorithms may be adopted to choose the throughput rates of various level groups, for example, a difference optimization algorithm or a quotient optimization algorithm. An example of the difference optimization algorithm is given. The minimum throughput rate of level group 1 is 40% and the current throughput rate of level group 1 is 30% so that the difference between the two rates is 10%. The minimum throughput rate of level group 2 is 50% and the current throughput rate of level group 2 is 20% so that the difference between the two rates is 30%. It can be determined that calls in level group 2 which has a larger difference in throughput rate will be routed. Likewise, in the case of the quotient optimization algorithm, the quotient between the current throughput rate and the minimum throughput of each level group is compared so as to determine the level group in which calls are to be routed. According to the assumption above, the quotient of throughput rates of level group 1 is ¾ and the quotient of throughput rates of level group 2 is ⅖. Therefore, calls in level group 2 which has a lower quotient of throughput rates are to be routed. The above are just simple examples. The difference optimization algorithm and quotient optimization algorithm may be further improved.

When a call queue is routed, the current throughput rate, the expected throughput rate and the minimum throughput rate of each level group are compared according to the algorithm so as to determine the level group in which calls are routed in precedence.

According to some embodiments, it is unnecessary to break the order of level groups in the call queue. Instead, an expected throughput rate and a minimum throughput rate are set for each level group in the call queue. When the agent chooses to route the call queue, the current throughput rate, expected throughput rate and minimum throughput rate of the level groups are analyzed according to a certain algorithm so as to determine which level group to route.

A simple example of the method shown in FIG. 5 is given below.

A call queue includes four level groups, A, B, C and D, whose levels descend in order. The preset minimum throughput rates and current throughput rates of the four level groups are listed in Table 2.

TABLE 2

| | Level group A | Level group B | Level group C | Level group D |
|---|---|---|---|---|
| Preset minimum throughput rate | 80% | 70% | 60% | 50% |
| Current throughput rate | 90% | 72% | [55%] | 55% |

In the table, the current throughput rate of level group C is lower than its preset minimum throughput rate.

Suppose the agent chooses calls in the call queue to route. The agent determines the level group of the highest priority according to a relation between the current throughput rate and the minimum throughput rate of every level group. Apparently, in Table 2, the current throughput rate of level group C is already below its minimum throughput rate. Therefore, level group C is determined as a group of the highest priority and the agent chooses calls in level group C to route.

According to the above method, an some embodiments as may be described herein may provide an apparatus for optimizing layered service routing of a call center.

The composition of a call center is described before the apparatus. FIG. 7 shows a typical call center. Basic components of the call center include: Automatic Call Distributor (ACD), Interactive Voice Response (IVR) system, Computer Telephony Integration (CTI) server, agent, database server and management platform. Extended components are gradually added with the development of the call center technologies. The extended components may include: web server, fax server and Internet Protocol (IP) telephone gateway.

The ACD distributes a customer call to the most proper agent in a service group according to a certain distribution algorithm; the IVR provides voice navigation, voice answer and recording functions for the customer; the CTI provides software control and hardware support for implementing call center services, including screen popup, voice mediation, data transfer, personalized call routing, and automatic dialing.

The apparatus provided according to some embodiments may incorporate improvements in the management of call queues. The apparatus may be located in an ACD but also may be located elsewhere.

Figure 8:
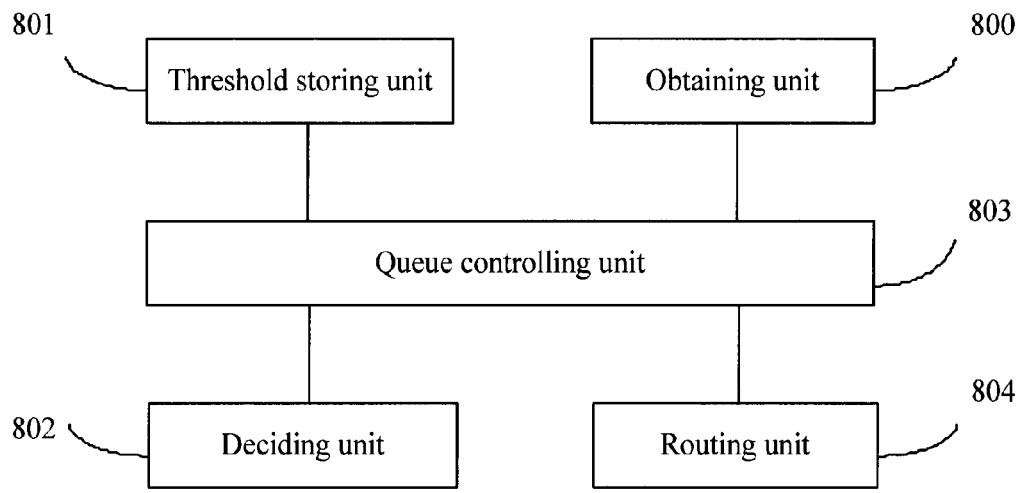
FIG. 8 is a schematic drawing showing a structure of an apparatus for optimizing layered service routing of a call center according to some embodiments.

As shown in FIG. 8, the apparatus for optimizing layered service routing of a call center according to some embodiments may include an obtaining unit 800, a threshold storing unit 801, a deciding unit 802, a queue controlling unit 803, and a routing unit 804.

The obtaining unit 800 is adapted to obtain a current level parameter of each call in a call queue; the threshold storing unit 801 is adapted to store a level parameter threshold of each level group in the call queue; the deciding unit 802 is adapted to determine a compared call for level comparison with a new call from the tail of the call queue; the queue controlling unit 803 is adapted to judge whether the current level parameter of the level group where the compared call belongs is larger than or equal to the level parameter threshold of the level group where the compared call belongs when the level of the new call is higher than the level of the compared call, and place the new call after the compared call if the current level parameter of the level group where the compared call belongs is larger than or equal to the level parameter threshold of the level group where the compared call belongs; the routing unit 804 is adapted to route calls at the head of the call queue.

Preferably, the level parameter obtained by the obtaining unit 800 is a cumulative queuing duration and the level parameter threshold stored by the threshold storing unit 801 is a queue tolerance duration.

Figure 9:
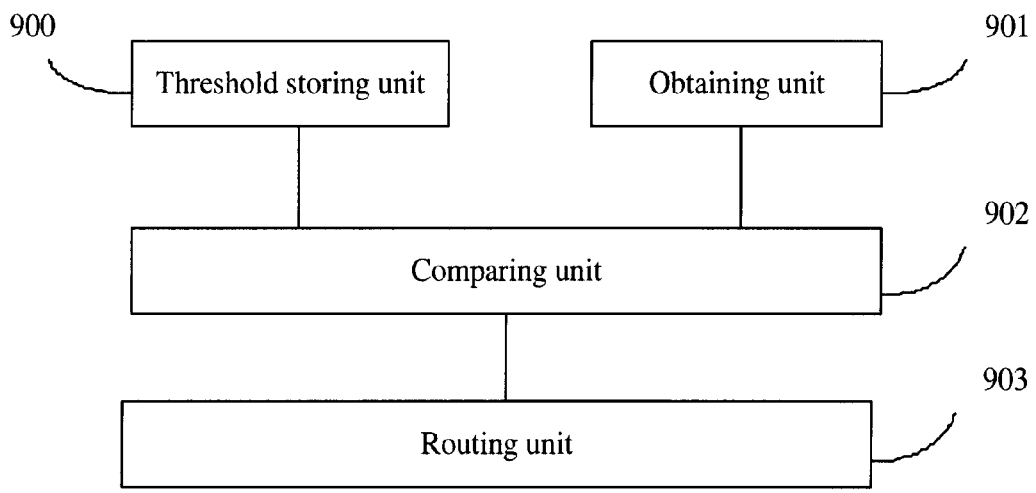
FIG. 9 is a schematic drawing showing a structure of another apparatus for optimizing layered service routing of a call center according to some embodiments

FIG. 9 shows another apparatus for optimizing layered service routing of a call center according to some embodiments. The apparatus includes a threshold storing unit 900, an obtaining unit 901, a comparing unit 902, and a routing unit 903.

The threshold storing unit 900 is adapted to store a level parameter threshold of each level group in a call queue; the obtaining unit 901 is adapted to obtain a current level parameter of each level group; the comparing unit 902 is adapted to compare the current level parameter of each level group with the level parameter threshold of the level group respectively and determine a level group of the highest priority with reference to the comparison result; the routing unit 903 is adapted to route calls in the level group of the highest priority.

Preferably, the level parameter obtained by the obtaining unit 901 is a throughput rate and the level parameter threshold stored by the threshold storing unit 900 is a minimum throughput rate.

According to some embodiments, a minimum throughput rate may be set for each level group in the call queue and stored in the threshold storing unit 900. The obtaining unit 901 obtains the current throughput rate of each level group. When the comparing unit 902 finds that the current throughput rate of one level group is below or equal to its minimum throughput rate, the comparing unit 902 determines the level group as a group of the highest priority; when the comparing unit 902 finds that the current throughput rates of multiple level groups are below or equal to respective minimum throughput rates, the comparing unit 902 determines one of the level groups as a group of the highest priority according to a routing algorithm. The routing algorithm may be one of the algorithms stated in the method embodiments hereinbefore.

The apparatus embodiments are exemplary. The units stated as separate components may be or not be physically separated and the components presented as units may be or not be physical units, which means they may be placed in one location or distributed in multiple network elements. Part or all modules may be chosen as needed according to some embodiments.

According to the descriptions of the foregoing embodiments, those skilled in art may be clear that the disclosed embodiments may be implemented by software on a necessary general hardware platform or implemented by hardware only. According to such understanding, the essence of the disclosed embodiments, or contributions to the conventional art by the solution may be represented by a software product, which may be stored in a computer-readable storage medium, such as a Read-Only Memory/Random Access Memory (ROM/RAM), a magnetic disk, and a compact disk. The software product includes a number of instructions that enable a computer device (which may be a personal computer, a server or a network device) having a processor or other processing unit to execute the disclosed methods according to the disclosed embodiments. Some embodiments may be apparent to those skilled in the art from consideration of the specification and practice of the embodiments disclosed herein. It is intended that the specification and examples be considered as exemplary only, with a true scope and spirit of the embodiments disclosed herein being indicated by the following claims.

What is claimed is:

1. A method for optimizing layered service routing of a call center, comprising:
    counting a cumulative queue time of each call;
    setting a level parameter threshold for each level group in a call queue;
    determining a compared call from a tail of the call queue when a new call arrives;
    inserting the new call after the compared call if a current level parameter of the compared call is larger than or equal to a level parameter threshold of a level group where the compared call belongs when level of the new call is higher than level of the compared call; and
    routing calls from a head of the call queue;
    wherein the current level parameter is a cumulative queuing duration and the level parameter threshold is a queue tolerance duration.

2. The method according to claim 1, further comprising:
    inserting the new call after the compared call if the level of the new call is lower than the level of the compared call; and
    inserting the new call ahead of the compared call if the level of the new call is higher than the level of the compared call and the current level parameter of the compared call is lower than the level parameter threshold of the level group where the compared call belongs.

3. An apparatus for optimizing layered service routing of a call center, comprising:
    a threshold storing unit, adapted to store a level parameter threshold of each level group in a call queue, wherein the level parameter threshold is a queue tolerance duration;
    an obtaining unit, adapted to obtain a current level parameter of each call, wherein the current level parameter is a cumulative queuing duration;
    a deciding unit, adapted to determine a compared call for level comparison with a new call from a tail of the call queue;
    a queue controlling unit, adapted to judge whether a current level parameter of the compared call is larger than or equal to a level parameter threshold of a level group where the compared call belongs when level of the new call is higher than the level of the compared call and if so, insert the new call after the compared call; and
    a routing unit, adapted to route calls at a head of the call queue.

* * * * *